(12) United States Patent
Rhoden

(10) Patent No.: US 10,428,816 B2
(45) Date of Patent: Oct. 1, 2019

(54) VARIABLE SPEED MULTI-STAGE PUMP

(71) Applicant: Hamilton Sundstrand Corporation, Charlotte, NC (US)

(72) Inventor: William E. Rhoden, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 227 days.

(21) Appl. No.: 15/332,040

(22) Filed: Oct. 24, 2016

(65) Prior Publication Data

US 2018/0112660 A1    Apr. 26, 2018

(51) Int. Cl.
| | |
|---|---|
| F04C 14/08 | (2006.01) |
| B64D 37/00 | (2006.01) |
| F04C 2/08 | (2006.01) |
| F04C 11/00 | (2006.01) |
| F04C 13/00 | (2006.01) |
| F04C 15/00 | (2006.01) |
| F04C 2/10 | (2006.01) |

(52) U.S. Cl.
CPC ............ F04C 14/08 (2013.01); B64D 37/005 (2013.01); F04C 2/084 (2013.01); F04C 11/001 (2013.01); F04C 11/003 (2013.01); F04C 13/001 (2013.01); F04C 15/0061 (2013.01); F04C 2/10 (2013.01); F04C 2210/203 (2013.01)

(58) Field of Classification Search
CPC ........ F04C 14/08; F04C 14/02; F04C 11/001; F04C 2/10; F04C 15/0061; F04C 15/0057; F04C 13/001; F04C 11/003; F04C 2/084; F04C 2210/203; F04C 2210/1044; F04C 23/001; F04C 14/008; F04C 15/0073; F04C 2/08; F04C 29/005; F04C 28/08; F02C 7/236; F02C 7/32; F02C 7/22; F02C 9/30; B64D 37/005; F04D 13/12
See application file for complete search history.

(56) References Cited

U.S. PATENT DOCUMENTS

| | | | |
|---|---|---|---|
| 4,004,412 | A | 1/1977 | Burnell |
| 4,102,606 | A | 7/1978 | Huber et al. |
| 4,420,289 | A | 12/1983 | Silhouette |
| 4,656,827 | A | 4/1987 | Puillet |

(Continued)

FOREIGN PATENT DOCUMENTS

| | | |
|---|---|---|
| CN | 202597086 U | 12/2012 |
| CN | 204610308 U | 9/2015 |

(Continued)

OTHER PUBLICATIONS

English Translation of DE10104635A1 description dated Oct. 2, 2002 (Year: 2002).*

(Continued)

*Primary Examiner* — Nathan C Zollinger
(74) *Attorney, Agent, or Firm* — Cantor Colburn LLP

(57) ABSTRACT

A multi-stage gear pump includes a first pump stage, a second pump stage, and a variable speed gearbox including an input and an output, wherein the input is rotationally coupled to the first pump stage and the input rotates at a first rotational speed, and the output is rotationally coupled to the second pump stage and rotates at a second rotational speed, wherein a variable gear ratio determines the second rotational speed relative to the first rotational speed.

13 Claims, 3 Drawing Sheets

(56) References Cited

U.S. PATENT DOCUMENTS

| | | | | |
|---|---|---|---|---|
| 5,241,826 A * | 9/1993 | Stearns | | F02C 7/236 |
| | | | | 60/734 |
| 5,326,232 A * | 7/1994 | McDonnel | | F04C 11/001 |
| | | | | 417/319 |
| 5,957,666 A * | 9/1999 | Lee | | F04B 23/106 |
| | | | | 417/269 |
| 6,079,198 A | 6/2000 | Prowse et al. | | |
| 7,524,263 B2 | 4/2009 | Johnson et al. | | |
| 8,127,748 B2 * | 3/2012 | Yates | | F02C 7/236 |
| | | | | 123/508 |
| 8,484,977 B2 * | 7/2013 | Bader | | F02C 7/236 |
| | | | | 60/39.281 |
| 8,853,878 B1 | 10/2014 | White | | |
| 9,151,180 B2 | 10/2015 | Veilleux, Jr. | | |
| 9,206,802 B2 | 12/2015 | Dalziel et al. | | |
| 9,260,107 B2 | 2/2016 | Doering et al. | | |
| 9,453,463 B2 * | 9/2016 | Zielinski | | F02C 7/236 |
| 9,776,728 B2 * | 10/2017 | Ni | | B64D 37/04 |
| 2002/0192082 A1 * | 12/2002 | Hansen | | F02C 7/22 |
| | | | | 417/251 |
| 2005/0232784 A1 * | 10/2005 | Yates | | F04C 11/001 |
| | | | | 417/199.1 |
| 2011/0129359 A1 | 6/2011 | Hawkins | | |
| 2012/0234015 A1 * | 9/2012 | Reuter | | F02C 7/236 |
| | | | | 60/776 |
| 2012/0260658 A1 * | 10/2012 | Bader | | F02C 7/236 |
| | | | | 60/734 |
| 2014/0150440 A1 | 6/2014 | Suciu et al. | | |
| 2014/0298819 A1 * | 10/2014 | Lindeman | | F01D 15/08 |
| | | | | 60/776 |
| 2015/0275769 A1 | 10/2015 | Foutch et al. | | |
| 2015/0315980 A1 | 11/2015 | Edwards et al. | | |
| 2016/0017973 A1 | 1/2016 | Steidten et al. | | |
| 2016/0025192 A1 | 1/2016 | Kennedy | | |
| 2016/0146108 A1 * | 5/2016 | Yates | | F04B 41/06 |
| | | | | 415/124.1 |
| 2016/0186670 A1 | 6/2016 | Oba | | |

FOREIGN PATENT DOCUMENTS

| | | | | |
|---|---|---|---|---|
| DE | 10104635 A1 * | 10/2002 | | F01M 1/16 |
| DE | 10104635 A1 | 10/2002 | | |
| EP | 2562420 A2 | 2/2013 | | |
| EP | 2913500 A1 | 9/2015 | | |
| JP | 05141272 H | 6/1993 | | |
| WO | 200017542 A1 | 3/2000 | | |
| WO | 2002025115 A1 | 3/2002 | | |

OTHER PUBLICATIONS

Search Report dated Mar. 19, 2018, EP Application No. 17198142, 7 pages.

* cited by examiner

VARIABLE SPEED MULTI-STAGE PUMP

BACKGROUND

The subject matter disclosed herein relates to gear driven fuel pumps, and more particularly, to gear driven fuel pumps for aircraft.

Gear driven fuel pumps can be utilized within an aircraft to provide fuel pressure to engines and hydraulic actuators. Fuel pumps are designed and specified to provide a desired amount of fuel under peak demand conditions. Often, fuel pumps may pump excess fuel flow under lower demand conditions which may heat fuel.

BRIEF SUMMARY

According to an embodiment, a multi-stage gear pump includes a first pump stage, a second pump stage, and a variable speed gearbox including an input and an output, wherein the input is rotationally coupled to the first pump stage and the input rotates at a first rotational speed, and the output is rotationally coupled to the second pump stage and rotates at a second rotational speed, wherein a variable gear ratio determines the second rotational speed relative to the first rotational speed.

According to an embodiment, a method to operate a multi-stage gear pump includes providing a first pump stage, providing a second pump stage, rotationally coupling an input of a variable speed gearbox to the first pump stage, rotating the first pump stage at a first rotational speed, determining a second rotational speed relative to the first rotational speed via a variable gear ratio of the variable speed gearbox, rotationally coupling an output of the variable speed gearbox to the second pump stage, and rotating the second pump stage at the second rotational speed.

Technical function of the embodiments described above includes a variable speed gearbox including an input and an output, wherein the input is rotationally coupled to the first pump stage and the input rotates at a first rotational speed, and the output is rotationally coupled to the second pump stage and rotates at a second rotational speed, wherein a variable gear ratio determines the second rotational speed relative to the first rotational speed.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
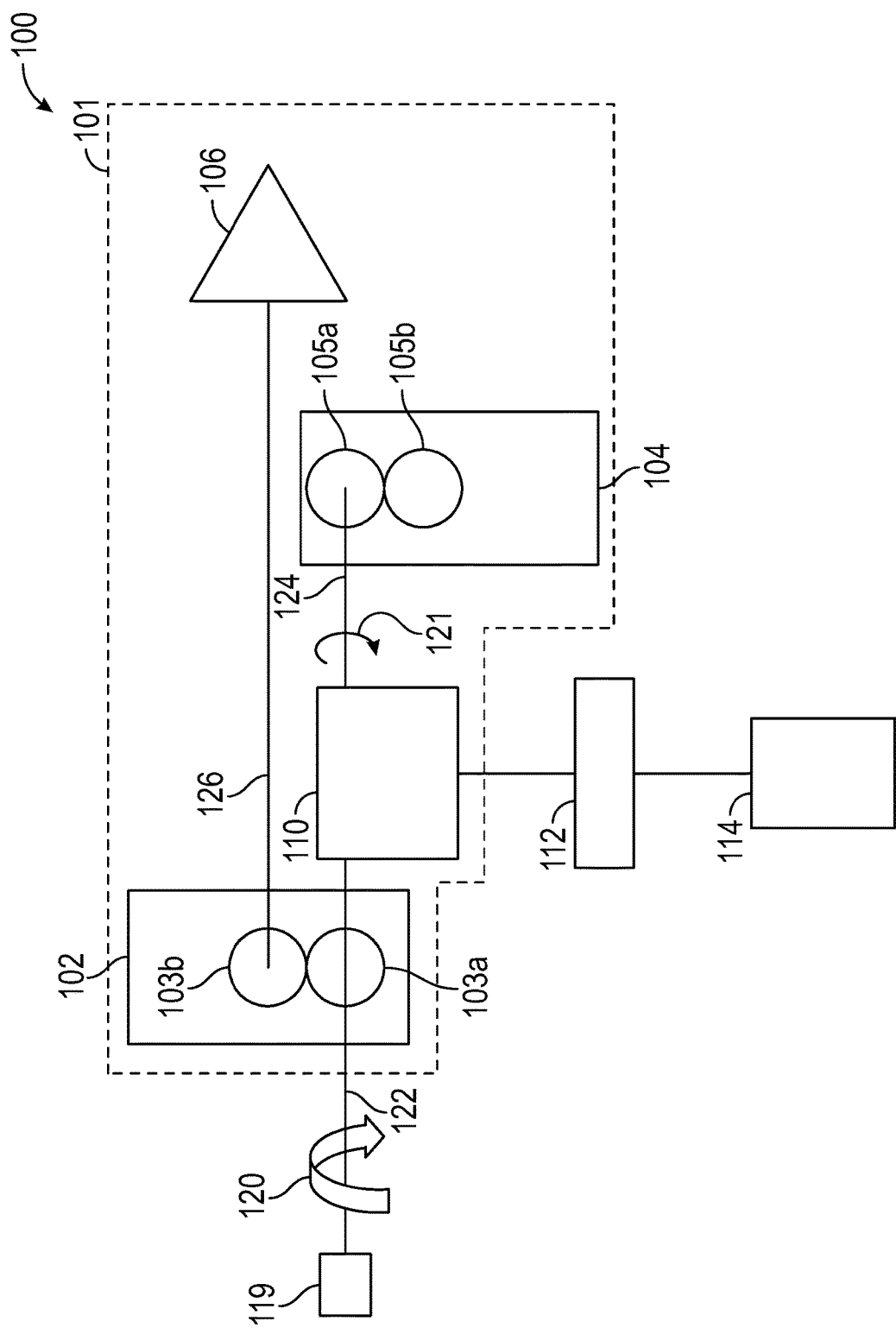
FIG. 1 is a schematic view of an embodiment of a multi-stage gear pump.

Referring to the drawings, FIG. 1 shows a pump system 100. In the illustrated embodiment, the pump system 100 includes a multi-stage gear pump 101 including a main pump gear stage 102, an actuator gear stage 104, and a variable speed gearbox 110. In the illustrated embodiment, the multi-stage gear pump 101 can provide a desired fuel flow through either a main pump gear stage 102 or an actuator gear stage 104 by adjusting the gear ratio of the variable speed gearbox 110. Advantageously, the use of the variable speed gearbox 110 allows for the actuator gear stage 104 to be driven at a different speed than the main pump gear stage 102 to allow for a desired amount of fuel to be delivered by both the main pump gear stage 102 and the actuator gear stage 104 on demand without any excess fuel pumping. Further, by reducing excess fuel pumping, heating of fuel can be reduced preventing varnish or coking of fuel within the fuel system and the aircraft.

In the illustrated embodiment, the pump stages 102, 104, 106 of the multi-stage gear pump 101 can be located in a common housing, while in other embodiments, the pump stages 102, 104, 106 can be located in separate housings and commonly driven or otherwise operatively connected. In the illustrated embodiment, the multi-stage gear pump 101 receives rotational energy from a rotational device 119. The rotational device 119 can be a rotational drive from an engine, an engine gearbox or any other power source. The rotational device 119 can rotate the input shaft 122 at a first rotational speed 120. The first rotational speed 120 can vary in accordance with operational speed of the rotational device 119.

In the illustrated embodiment, the main pump gear stage 102 is driven by the rotational device 119. In the illustrated embodiment, the main pump gear stage 102 includes a rotational input 103a and a rotational output 103b associated with the gears within the main pump gear stage 102. The main pump gear stage 102 supplies fuel to an engine of an aircraft. The main pump gear stage 102 speed and fuel output are related to the rotational speed of the main pump gear stage 102.

The main pump gear stage 102 can receive rotational input from the rotational device 119 or any other suitable power source via the rotational input 103a. In the illustrated embodiment, the rotational device 119 can rotate an input shaft 122 to rotate the rotational input 103a. In the illustrated embodiment, the rotational input 103a is a pass through that allows the input shaft 122 to pass therethrough while driving the rotational input 103a. The pass through of the rotational input 103a can allow multiple devices to be rotated by the same shaft that passes therethrough.

Further, the main pump gear stage 102 can provide a rotational output via the rotational output 103b. In the illustrated embodiment, rotation of the gears within the main pump gear stage 102 can drive the rotational output 103b. In the illustrated embodiment, the rotational output 103b can rotate an output shaft, such as centrifugal boost shaft 126 to drive other rotating components, such as the centrifugal boost stage 106. In certain embodiments, the rotational output 103b can rotate at the same first rotational speed 120 that is received via the rotational input 103a.

In other embodiments, the rotational output 103b can have a relative gear ratio and drive the rotational output 103b at a different rotational speed. Therefore, in certain embodiments, the rotational output 103b can drive the centrifugal boost shaft 126 at a rotational speed varying from the first rotational speed 120.

In certain embodiments, the rotational output 103b is a pass through that allows an output shaft to pass therethrough. The pass through of the rotational output 103b can allow multiple devices to be rotated by the same shaft that passes therethrough.

The centrifugal boost stage 106 can receive rotational input from the rotational output 103b of the main pump gear stage 102. The rotational output 103a can rotate the centrifugal boost shaft 126 to rotate the centrifugal boost stage 106. The centrifugal boost stage 106 can be rotated at the same speed as the rotational output 103b.

In the illustrated embodiment, the centrifugal boost stage 106 is a pump to boost fuel pressure as needed. In the illustrated embodiment, the rotational speed of the centrifugal boost pump 106 corresponds to the output of the centrifugal boost pump.

In the illustrated embodiment, the actuator gear stage 104 is driven by the variable speed gearbox 110. In the illustrated embodiment, the actuator gear stage 104 includes a rotational input 105a and a rotational output 105b associated with the gears within the actuator gear stage 104. The actuator gear stage 104 supplies fuel to fueldraulic/hydraulic actuators within the aircraft. The actuator gear stage 104 speed and fuel output corresponds to the rotational speed of the actuator gear stage 104. In the illustrated embodiment, the actuator gear stage 104 typically has lower fuel flow demands than the main fuel pump, and may have different fuel demands at different times.

The actuator gear stage 104 can receive rotational input from the variable speed gearbox 110 or any other suitable power source via the rotational input 105a. In the illustrated embodiment, the variable speed gearbox 110 can rotate an output shaft 124 to rotate the rotational input 105a. In the illustrated embodiment, the rotational input 105a is a pass through that allows a shaft to pass therethrough while driving the rotational input 105a. The pass through of the rotational input 105a can allow multiple devices to be rotated by the same shaft that passes therethrough.

Further, the actuator gear stage 104 can provide a rotational output via the rotational output 105b. In the illustrated embodiment, rotation of the gears within the actuator gear stage 104 can drive the rotational output 105b. In the illustrated embodiment, the rotational output 105b can rotate an output shaft to drive other rotating components. In certain embodiments, the rotational output 105b can rotate at the same second rotational speed 121 that is received via the rotational input 105a.

In other embodiments, the rotational output 105b can have a relative gear ratio and drive the rotational output 105b at a different rotational speed. Therefore, in certain embodiments, the rotational output 105b can drive rotational components at a rotational speed varying from the second rotational speed 121.

In certain embodiments, the rotational output 105b is a pass through that allows an output shaft to pass therethrough. The pass through of the rotational output 105b can allow multiple devices to be rotated by the same shaft that passes therethrough.

The variable speed gearbox 110 is connected to the input shaft 122 and the output shaft 124. In the illustrated embodiment, the variable speed gearbox 110 receive a first rotational speed 120 of the input shaft 122 and can output and adjust the second rotational speed 121 of the output shaft 124. Advantageously, the second rotational speed 121 of the output shaft 124 can be adjusted by adjusting the gear ratio of the variable speed gearbox 110 in response to fuel demands.

In the illustrated embodiment, the variable speed gearbox 110 can include any suitable combination of gears or other power transmission to variably adjust the second rotational speed 121 of the output shaft 124. In the illustrated embodiment, the variable speed gearbox 110 can rotate the output shaft 124 at a second rotational speed 121 slower than the first rotational speed 120 of the input shaft 122 or faster than the first rotational speed 120 of the input shaft 122.

Advantageously, since the second rotational speed 121 of the output shaft 124 corresponds to the pump output of the pump rotationally connected to the output shaft 124, the fuel flow output of the corresponding pump can be adjusted by varying the gear ratio of the variable speed gearbox 110.

In the illustrated embodiment a controller 112 and an electronic engine controller 114 can work in conjunction to control the second rotational speed 121 of the output shaft 124 in response to fuel demands and other operating conditions. The electronic engine controller 114 can provide operational parameters including engine fuel demands, actuator flow demands, fuel temperature, fuel pressure, fuel flow rates, etc. to determine the current demand for the main pump gear stage 102 and the actuator gear stage 104. The electronic engine controller 114 can provide operational parameters to the controller 112 to control the variable speed gearbox 110 to provide a desired second rotational speed 121 of the output shaft 124.

For example, during periods of low engine load and high actuator load, it may be desired to overdrive the output shaft 124 to provide a higher second rotational speed 121 relative to the first rotational speed 120 of the input shaft 122. Further, during periods of high engine load and low actuator load, the output shaft 124 can be rotated at a lower second rotational speed 121. The controller 112 can further take into account the size and displacement of the pumps associated with the main pump gear stage 102 and the actuator pump stage 104. Advantageously, by varying the speed of the pump stages 102, 104 pumps can be sized based on different parameters and not peak demand. Advantageously pump speeds can be increased under demand and reduced under periods of low demand. Further, unnecessary heating of fuel can be reduced, reducing coking and varnishing of fuel.

Figure 2:
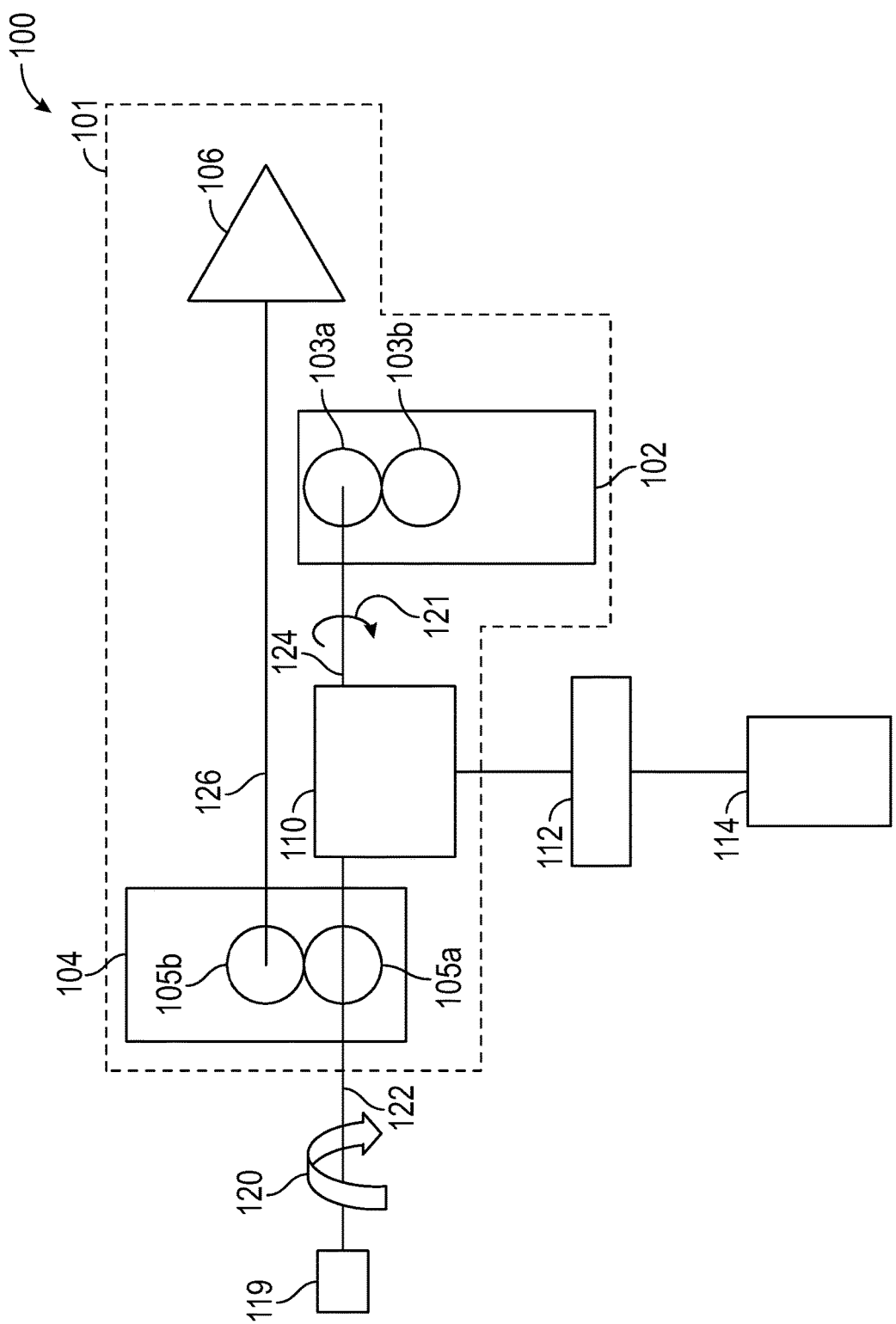
FIG. 2 is a schematic view of another embodiment of a multi-stage gear pump.

Referring to FIG. 2, an alternative embodiment of the multi-stage gear pump 101 is shown. In the illustrated embodiment, the actuator gear stage 104 is directly driven by the rotational device 119 and the main fuel pump 102 is driven by the variable speed gearbox 110. In the illustrated embodiment, the centrifugal boost stage 106 is driven by the rotational output 105b of the actuator gear stage 104. Advantageously, the actuator gear stage 104 can be directly driven to provide greater flow from the actuator pump in applications that require high actuator fuel flow.

Figure 3:
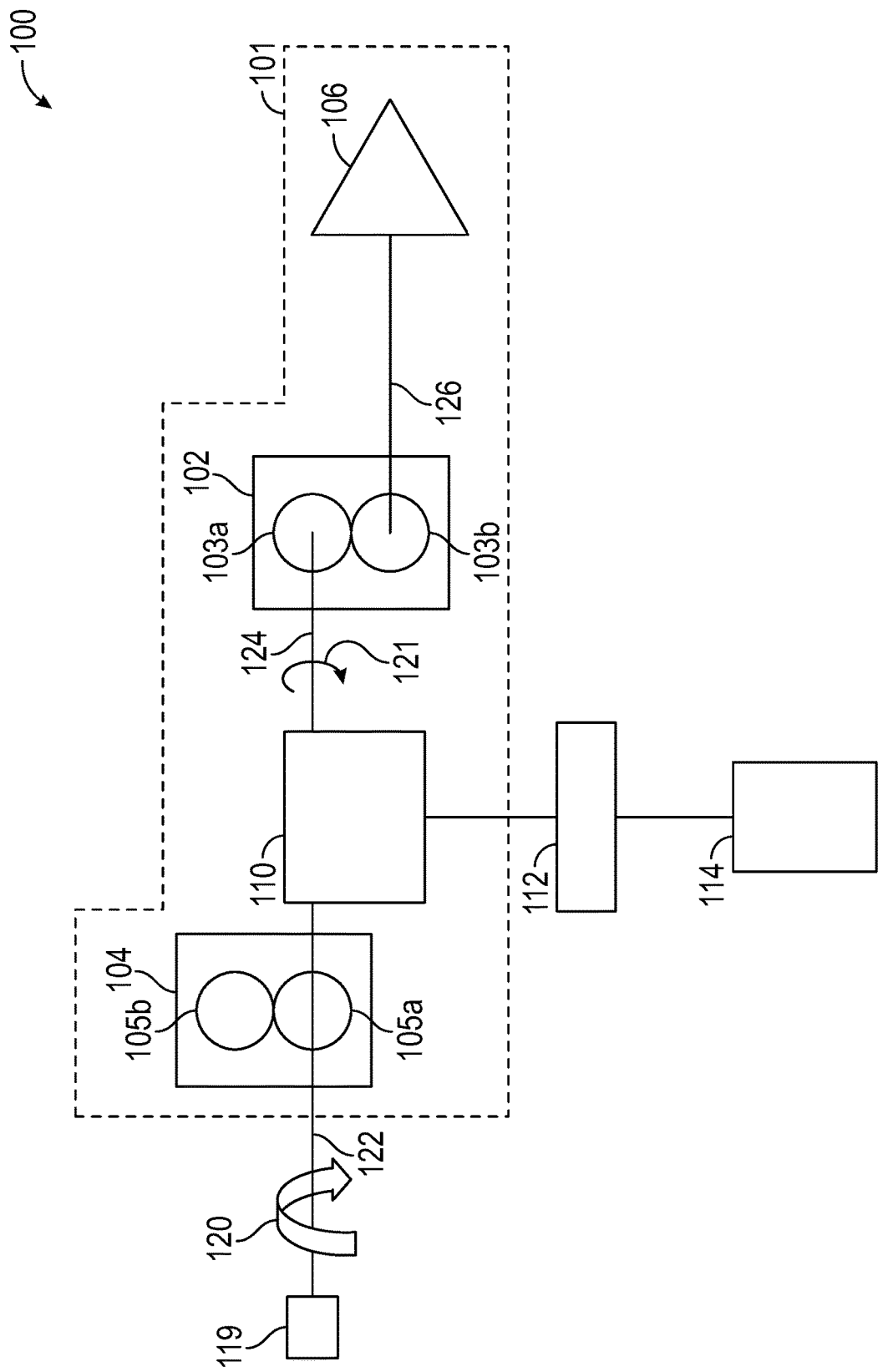
FIG. 3 is a schematic view of another embodiment of a multi-stage gear pump.

Referring to FIG. 3, an alternative embodiment of the multi-stage gear pump 101 is shown. In the illustrated embodiment, the actuator gear stage 104 is directly driven by the rotational device 119 and the main fuel pump 102 is driven by the variable speed gearbox 110. In the illustrated embodiment, the centrifugal boost stage 106 is driven by the rotational output 103b of the main pump gear stage 102. Advantageously, the actuator gear stage 104 can be directly driven to provide greater flow from the actuator pump in applications that require high actuator fuel flow. Further, by arranging the centrifugal boost shaft 126 to be driven by the main pump gear stage 102 the multi-stage gear pump 101 can be packaged for a suitable location or application.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A multi-stage gear pump, comprising:
   a first pump stage;
   a second pump stage; and
   a variable speed gearbox including an input and an output, wherein:
   the input is rotationally coupled to the first pump stage and the input rotates at a first rotational speed,
   the output is rotationally coupled to the second pump stage and rotates at a second rotational speed,
   a variable gear ratio determines the second rotational speed relative to the first rotational speed, and
   the multi-stage gear pump further comprises a boost stage rotationally coupled to the first pump stage.

2. The multi-stage gear pump of claim 1, further comprising a gearbox controller to adjust the variable gear ratio.

3. The multi-stage gear pump of claim 2, further comprising an electronic engine controller to provide at least one operating parameter to the gearbox controller.

4. The multi-stage gear pump of claim 3, wherein the gearbox controller adjusts the variable gear ratio in response to the at least one operating parameter.

5. The multi-stage gear pump of claim 1, wherein the first pump stage is a main pump stage.

6. The multi-stage gear pump of claim 1, wherein the second pump stage is an actuator pump stage.

7. The multi-stage gear pump of claim 1, wherein the input of the variable speed gearbox is rotationally coupled to the first pump stage via an input shaft.

8. The multi-stage gear pump of claim 7, wherein the input shaft is rotationally coupled to a rotating device.

9. The multi-stage gear pump of claim 1, wherein the output of the variable speed gearbox is rotationally coupled to the second pump stage via an output shaft.

10. The multi-stage gear pump of claim 9, wherein the boost stage is rotationally coupled to the first stage pump via a boost stage shaft.

11. The multi-stage gear pump of claim 10, wherein the boost stage shaft is rotationally coupled to a first rotational output of the first stage pump.

12. The multi-stage gear pump of claim 11, wherein the boost stage rotates at the first rotational speed.

13. A method to operate a multi-stage gear pump, comprising:
   providing a first pump stage;
   providing a second pump stage;
   rotationally coupling an input of a variable speed gearbox to the first pump stage;
   rotationally coupling a boost stage to the first pump stage;
   rotating the first pump stage at a first rotational speed;
   determining a second rotational speed relative to the first rotational speed via a variable gear ratio of the variable speed gearbox;
   rotationally coupling an output of the variable speed gearbox to the second pump stage; and
   rotating the second pump stage at the second rotational speed.

* * * * *